US008986026B2

(12) United States Patent
Utsunomiya et al.

(10) Patent No.: US 8,986,026 B2
(45) Date of Patent: Mar. 24, 2015

(54) ROTATABLE CONNECTOR DEVICE WITH PROVISIONAL FIXING MECHANISM FOR PROVISIONALLY FIXING ROTATABLE-SIDE MEMBER

(71) Applicants: Furukawa Electric Co., Ltd., Tokyo (JP); Furukawa Automotive Systems Inc., Shiga (JP)

(72) Inventors: Hirofumi Utsunomiya, Shiga (JP); Shuuji Hirai, Shiga (JP); Yasuharu Kakimoto, Shiga (JP)

(73) Assignees: Furukawa Electric Co., Ltd., Tokyo (JP); Furukawa Automotive Systems Inc., Shiga (JP)

( * ) Notice: Subject to any disclaimer, the term of this patent is extended or adjusted under 35 U.S.C. 154(b) by 0 days.

(21) Appl. No.: 14/228,051

(22) Filed: Mar. 27, 2014

(65) Prior Publication Data

US 2014/0212207 A1    Jul. 31, 2014

Related U.S. Application Data

(63) Continuation of application No. PCT/JP2012/075007, filed on Sep. 28, 2012.

(30) Foreign Application Priority Data

Sep. 29, 2011    (JP) .................................. 2011-214792

(51) Int. Cl.
*H01R 3/00*    (2006.01)
*H01R 35/04*    (2006.01)

(52) U.S. Cl.
CPC ...................................... *H01R 35/04* (2013.01)
USPC .......................................................... 439/164

(58) Field of Classification Search
USPC .............................................. 439/13–16, 164
See application file for complete search history.

(56) References Cited

U.S. PATENT DOCUMENTS

| 6,368,127 | B1 * | 4/2002 | Araki et al. | 439/164 |
| 2002/0025705 | A1 * | 2/2002 | Araki et al. | 439/164 |
| 2009/0075507 | A1 * | 3/2009 | Chikashige et al. | 439/159 |

FOREIGN PATENT DOCUMENTS

| JP | S63-159289 U | 10/1988 |
| JP | 2010-129187 A | 6/2010 |

OTHER PUBLICATIONS

International Search Report for PCT/JP2012/075007 mailed Dec. 11, 2012 (5 pages).
Notice of Reasons for Rejection in corresponding Japanese Application No. 2011-214792 dated Nov. 29, 2011 (5 pages).

* cited by examiner

*Primary Examiner* — Chandrika Prasad
(74) *Attorney, Agent, or Firm* — Osha Liang LLP (57) ABSTRACT

An engaging member moved upward by an urging force of a spring member built in a bottom part of a rotatable-side member has a fitting groove for allowing a top end of the spring member to be fit thereto; and engaging parts of the engaging member and engageable parts of a fixed-side member, which are engaged with each other to provisionally fix the rotatable-side member, are formed at one neutral position and at an opposite position opposite thereto.

8 Claims, 6 Drawing Sheets

ROTATABLE CONNECTOR DEVICE WITH PROVISIONAL FIXING MECHANISM FOR PROVISIONALLY FIXING ROTATABLE-SIDE MEMBER

TECHNICAL FIELD

The present invention relates to a rotatable connector device usable for signal transmission or power supply between a rotatable operation tool and a fixed body, and more specifically to a rotatable connector device for allowing a rotatable operation tool to be appropriately attached easily.

BACKGROUND ART

A rotatable connector device includes a fixed-side member fixed to a fixed body and a rotatable-side member which is attached to the fixed-side member so as to be relatively rotatable thereto and is rotatable by a rotatable operation tool. In a rotatable connector device provided in a steering wheel part of an automobile, the fixed-side member is fixed to a combination switch as the fixed body, and a steering wheel as the rotatable operation tool is attached to the rotatable-side member so as to be relatively non-rotatable thereto.

In the rotatable connector device provided in the steering wheel part, it is especially necessary that the rotatable-side member rotates leftward and rightward uniformly. For realizing this, the steering wheel needs to be attached to the rotatable-side member rotatable with respect to the fixed-side member in a state where the rotatable-side member is at a neutral position which is not eccentric leftward or rightward with respect to the fixed-side member.

As a rotatable connector device for allowing the steering wheel to be attached in such a manner easily, a device disclosed in Patent Document 1 has been proposed. This rotatable connector device operates as follows. The rotation-direction position of the rotatable-side member, which is set at a neutral position in advance, is provisionally fixed. When a steering wheel is attached to the rotatable connector device in this state, the rotatable-side member is automatically released from the provisional fixed state to provide an appropriate manner of attachment of the steering wheel.

Specifically, the rotatable connector device includes a fixed-side member, the rotatable-side member which is attached to the fixed-side member so as to be relatively rotatable thereto both leftward and rightward and which is rotatable along with the rotation of the steering wheel fit to a fitting hole at the center thereof, and a provisional fixing mechanism for provisionally fixing the rotatable-side member at the neutral position on the fixed-side member. The provisional fixing mechanism has a center hole for receiving a steering column rotatable by the steering wheel, and is fixed to a bottom part of the rotatable-side member so as to be relatively non-rotatable thereto. An engaging part (locking projection 47) of an engaging member (locking body 17) is moved upward by an urging force of a spring member (return spring 18), which is formed of a coil spring built in the provisional fixing mechanism in a state of surrounding the center hole. The engaging part is engaged with an engageable part (engaging part 66) of the fixed-side member to realize provisional fixation. (The reference numerals are those in Patent Document 1; this is applicable to the rest of this section of the specification.)

The engaging part is formed to project outward so as to run through a part of a bearing member (bearing sleeve 16), for receiving a bottom end of the spring member, from inside to the outside so that the engaging part is non-rotatable with respect to the bearing member. A pair of such engaging parts are formed at two positions which are on a straight line while having the center point of the center hole therebetween. The engageable part engageable with such an engaging part is formed at many positions all along the outer periphery of the center hole in the fixed-side member.

A spring contact face of the engaging member that is contactable with a top end of the spring member and an area in the vicinity thereof are formed to have a uniform planar shape.

When the rotatable connector device having such a structure is fixed to a combination switch and then the steering wheel is attached to the rotatable-side member, the engaging member of the provisional fixing mechanism is pushed upward against the urging force of the spring member, and the engaging part and the engageable part are disengaged. As a result, the steering wheel is made rotatable uniformly leftward and rightward.

CITATION LIST

Patent Literature

Patent Document 1: Japanese Laid-Open Patent Publication No. 2010-129187

SUMMARY OF INVENTION

Technical Problem

As described above, the number of the engageable parts is larger than the number of engaging parts, and the engageable parts are formed all along the outer periphery. Therefore, when the engaging member is moved upward by the urging force of the spring member, the engaging member may be engaged at a position other than the neutral position. Whether the position is the neutral position or not needs to be determined by separate unit, and thus it is not easy to provisionally fix the rotatable-side member at the neutral position accurately.

It is conceivable to form one engageable part for one engaging part. However, this has the following problem. The engaging member including the engaging part has a function of making the engaging part non-rotatable with respect to the spring member and is urged by the spring member. Therefore, unless being uniformly urged, the engaging member may be inclined to disengage the engaging part. When the engaging part is disengaged, the rotatable-side member needs to be set at the neutral position again and the previous work of setting is wasted.

The spring contact face for receiving the top end of the spring member for urging the engaging member is planar. Therefore, the position of the top end of the spring member with respect to the spring contact face is not stable. For this reason, when the spring member is extended or compressed by attachment or detachment of the spring wheel, the center position of the extension may be shifted and thus the spring contact face of the engaging member may not be uniformly urged. In this case also, the engaging member may be inclined to disengage the engaging part as described above.

The present invention has a main object of allowing a rotatable operation tool to be appropriately attached easily in a state where an engaging part is urged uniformly by a spring member, and the urged state in an engaged state and the urged state when the spring member is extended or compressed are both in a good balance.

Solution to Problem

The object is achieved by a rotatable connector device, including a fixed-side member fixed to a fixed body; a rotatable-side member which is attached to the fixed-side member so as to be rotatable with respect to the fixed-side member both leftward and rightward and is rotatable along with a rotation of a rotatable operation tool fit to a fitting hole at a center of the rotatable-side member; and a provisional fixing mechanism for provisionally fixing the rotatable-side member at a neutral position on the fixed-side member. The provisional fixing mechanism has a center hole for receiving a rotation shaft rotatable by the rotatable operation tool and is fixed to a bottom part of the rotatable-side member so as to be non-rotatable with respect to the rotatable-side member, and puts engaging parts, of an engaging member moved upward by an urging force of a spring member built in the provisional fixing mechanism in a state of surrounding the center hole, into engagement with engageable parts of the fixed-side member to provide provisional fixation; the engaging parts and the engageable parts are located at one neutral position at which the rotatable-side member is at the neutral position when the engaging parts and the engageable parts are engaged with each other, and at an opposite position opposite to the one neutral position with respect to a center point of the center hole; in the vicinity of a spring contact face of the engaging member that is contactable with a top end of the spring member, regulation unit for regulating the position of the top end of the spring member is provided; and the regulation unit is a fitting groove for allowing the top end of the spring member to be fit thereto.

According to the above-described structure, even when the engaging member is moved upward by the urging force of the spring member, the position, in a rotation direction of the rotatable-side member with respect to the fixed-side member, at which the engaging parts and the engageable parts are engageable with each other is limited to two positions including an appropriate position at which the rotatable-side member is located at the neutral position with respect to the fixed-side member. The engaging parts and the engageable parts are formed at the neutral position and the opposite position. Therefore, as compared with the case where one engaging part and one engageable part are provided, the engaging member is moved upward and downward while receiving the urging force of the spring member in a good balance. In addition, the position of the top end of the spring member is regulated by the regulation unit provided in the engaging member. Thus, the spring member or the engaging member are suppressed from being inclined when the spring member is extended or compressed, namely, when the rotatable operation tool is attached or detached.

In addition, the regulation unit is a fitting groove for allowing the top end of the spring member to be fit thereto. Since the fitting groove regulates the top end of the spring member with certainty, the stability of extension and compression can be kept high.

The regulation unit may be a cylindrical part located inner to the spring member. In this case, the positional shift of the top end of the spring member can be prevented, and also entrance of foreign objects can be prevented.

An inner diameter of the cylindrical part may be set to be larger than an inner diameter of the center hole formed at a center of a spring bearing for receiving the spring member. In this case, even if the rotatable connector device is inclined when being attached to, or detached from, the fixed body, the inconvenience that the engaging member contacts the rotation shaft and is abraded and thus comes off or is broken can be avoided.

The engaging parts and the engageable parts may be engaged with each other only in a state where the rotatable-side member is located at the neutral position with respect to the fixed-side member. Since the provisional fixation is realized only in a state where the rotatable-side member is at an appropriate position, the work of neutral position alignment is simplified.

Advantageous Effects of Invention

According to the present invention, the position, in a rotation direction of the rotatable-side member with respect to the fixed-side member, at which the engaging parts and the engageable parts are engageable with each other is limited to positions including an appropriate position at which the rotatable-side member is located at the neutral position. Therefore, neutral position alignment is easy, and the rotatable operation tool can be appropriately attached easily. In addition, the engaging parts and the engageable parts are located at the neutral position and an opposite position thereto, and also the engaging member includes the regulation unit for regulating the position of the top end of the spring member. Therefore, the urged state in an engaged state and the urged state when the spring member is extended or compressed are both in a good balance. This also allows the rotatable operation tool to be attached appropriately.

DESCRIPTION OF EMBODIMENTS

Hereinafter, an embodiment for carrying out the present invention will be described with reference to the drawings.

Figure 1:
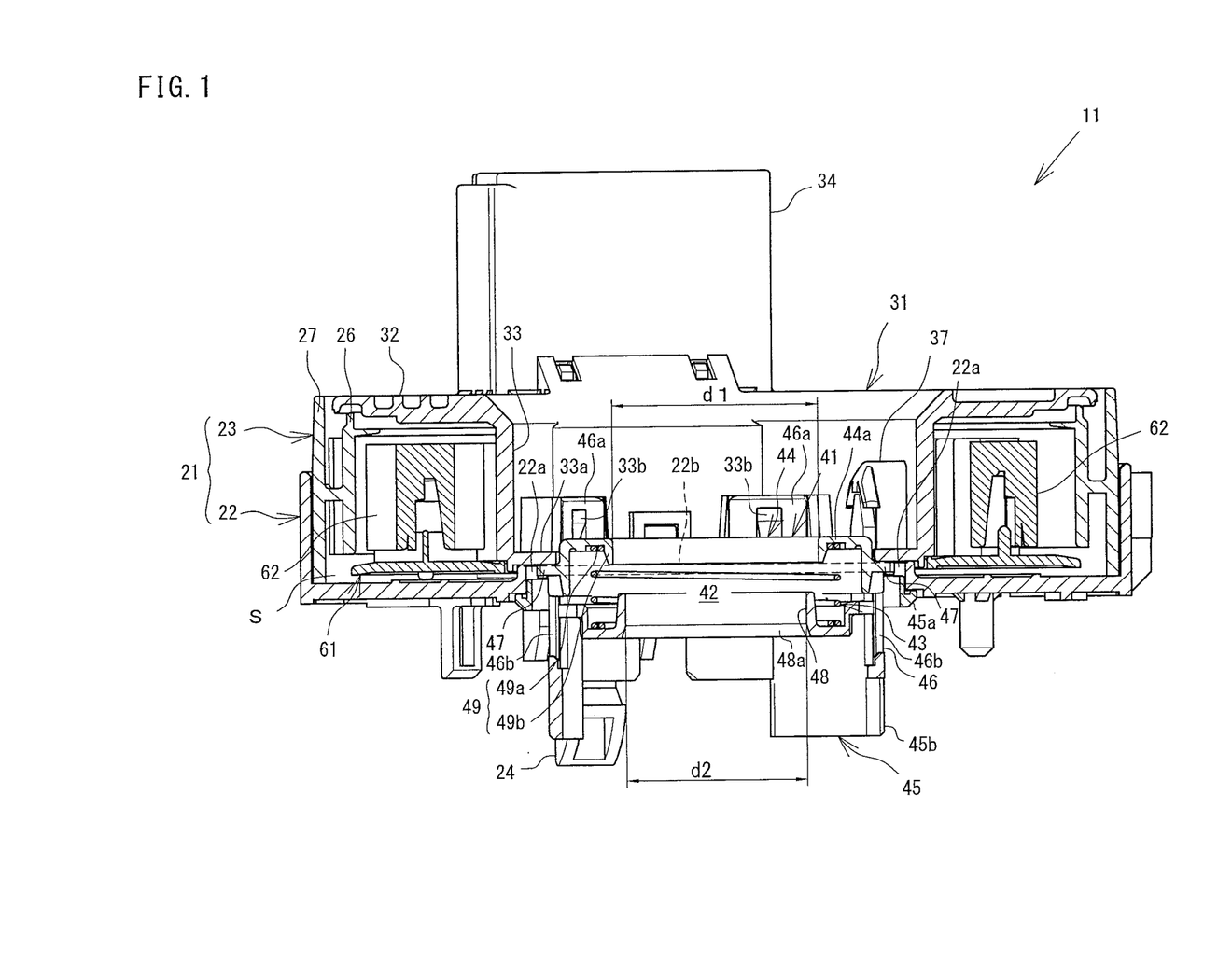
FIG. 1 is a longitudinal cross-sectional view of a rotatable connector device taken along a line passing engaging parts and engageable parts (along line A-A in FIG. 4).

FIG. 1 is a longitudinal cross-sectional view of a rotatable connector device 11 usable in a steering part of a vehicle. The rotatable connector device 11 achieves the object of allowing a rotatable operation tool to be appropriately attached thereto easily by the following structure. A provisional fixing mechanism 41, for provisionally fixing a rotator 31 at a neutral position on a stator 21, includes engaging parts 47 and engageable parts 22a. One of the engaging parts 47 and a corresponding one of the engageable parts 22a are located at one neutral position at which the rotator 31 is located at the neutral position when these parts are in engagement with each other. The other of the engaging parts 47 and the corresponding engageable part 22a are located at an opposite position, which is opposite to the one neutral position with respect to a center point of a center hole 42. In addition, in the vicinity of a spring contact face 44a of an engaging member 44 that is contactable with a top end of a spring member 43, regulation unit 49 for regulating the position of the top end of the spring member 43 is provided.

First, an overall schematic structure of the rotatable connector device 11 will be described.

Figure 2:
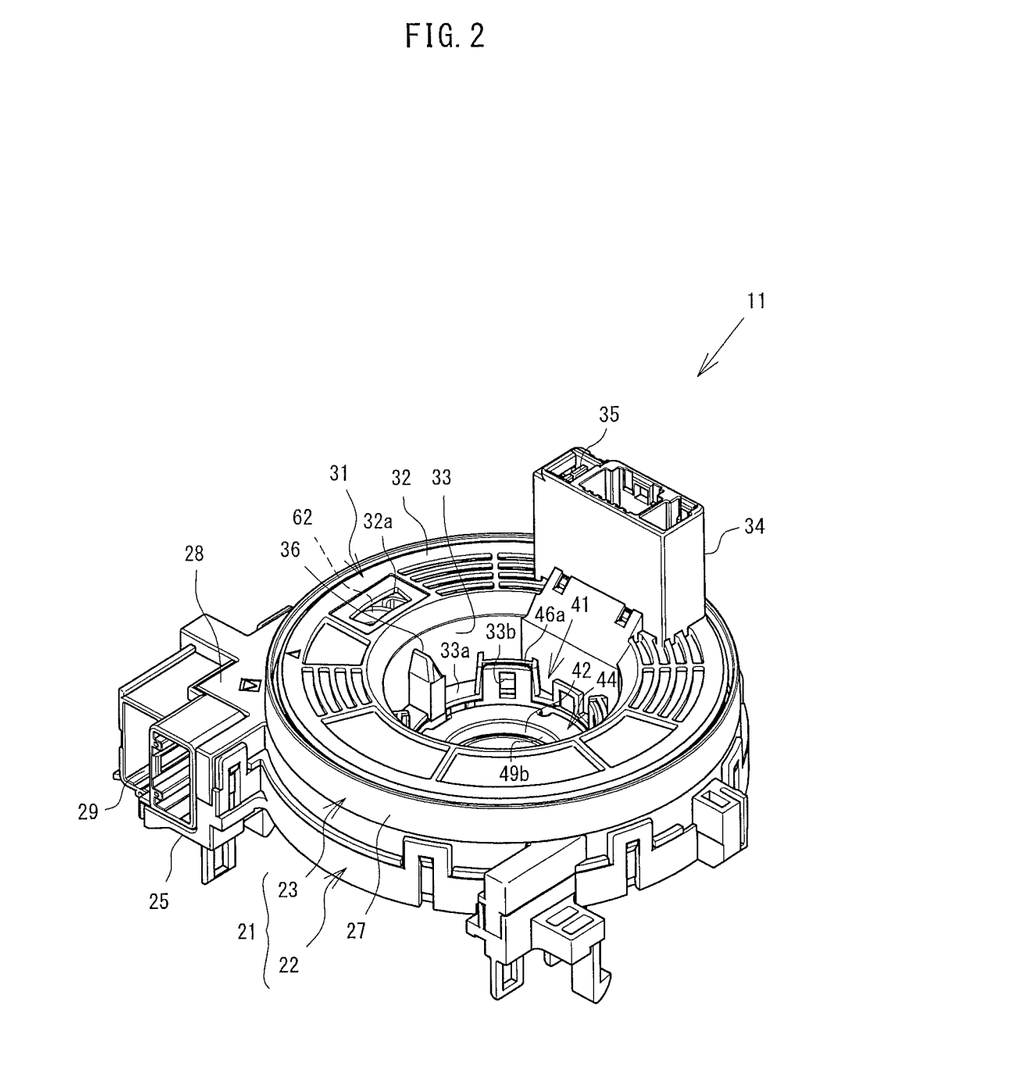
FIG. 2 is an isometric view of the rotatable connector device.

FIG. 2 is an isometric view of the rotatable connector device 11 as seen from the side of a top surface thereof. FIG.

Figure 3:
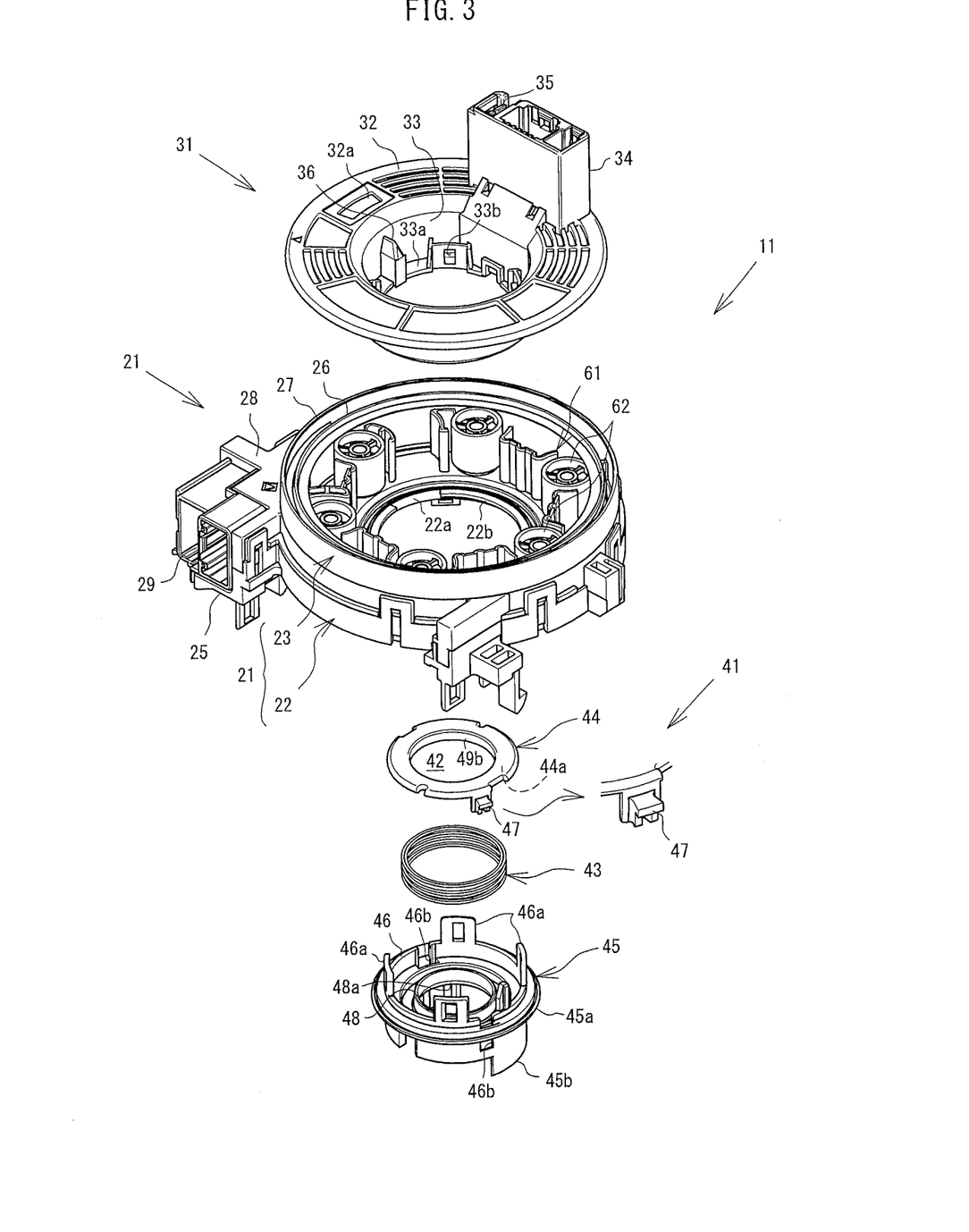
FIG. 3 is an exploded isometric view of the rotatable connector device.

3 is an exploded isometric view of the rotatable connector device 11. As shown in these figures, the rotatable connector device 11 includes the stator 21 as a fixed-side member which is located on a bottom surface side, the rotator 31 as a rotatable-side member which is located on the top surface side, and a provisional fixing mechanism 41 for holding the rotator 31 at the neutral position with respect to the stator 21 (neutral position of the rotatable connector device 11).

As shown also in the longitudinal cross-sectional view of FIG. 1, the stator 21 includes a fixed-side ring plate 22 which is generally ring-shaped and has a circular hole at a center thereof, and an outer cylinder 23 which is circular as seen in a plan view. The outer cylinder 23 is engaged with a top surface of an outer peripheral part of the fixed-side ring plate 22 and thus is integral with the fixed-side ring plate 22.

The fixed-side ring plate 22 includes fixation unit such as a fixing claw 24 or the like, which is to be fixed to a combination switch (not shown) as a fixed body. A connector housing 25 projecting appropriately outward is formed at a position outer to the position at which the outer cylinder 23 is fixed.

The outer cylinder 23 has a double-wall structure. A inner wall 26 located inside is formed to have a smaller height than that of an outer wall 27 located outside. At a position which is outer to the outer wall 27 and corresponds to the connector housing 25 of the fixed-side ring plate 22, a connector housing 28, which is to be assembled with the connector housing 25 of the fixed-side ring plate 22, is formed. An assembly of the connector housings 25 and 28 accommodates a connector 29 therein.

As shown in FIG. 2, the rotator 31 includes a top plate 32 which is ring-shaped as seen in a plan view and an inner cylinder 33 hung from an inner peripheral edge of the top plate 32. The top plate 32 and the inner cylinder 33 are integral with each other. The top plate 32 and the inner cylinder 33 are provided so as to form a ring-shaped accommodation space S, for accommodating a flexible flat cable (not shown), between the top surface of the fixed-side ring plate 22 of the stator 21 and an inner circumferential surface of the outer cylinder 23. Along a bottom end of the inner cylinder 33, an projecting part 33a projecting inward is formed.

The top plate 32 is set to have a size with which the top plate 32 is put on a top end of the inner wall 26 of the outer cylinder 23 but does not contact the outer wall 27. a connector housing 34 is formed integrally with top plate 32, and a connector 35 is built in the connector housing 34.

Figure 4:
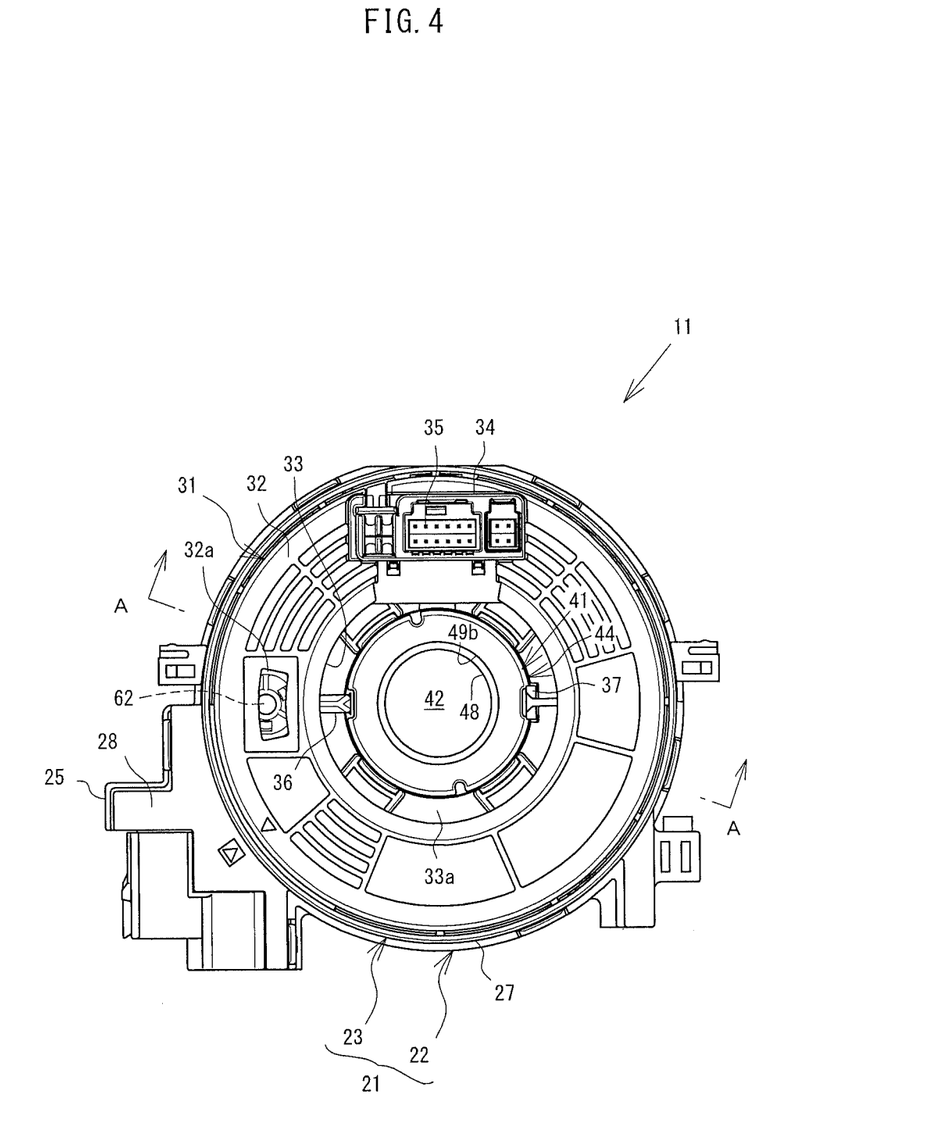
FIG. 4 is a plan view of the rotatable connector device.

On the inner circumferential surface of the inner cylinder 33, two engaging projections 36 and 37 (see FIG. 4) are integrally formed so as to transmit the rotation of a steering wheel 51 (see FIG. 6) as a rotatable operation tool. These engaging projections 36 and 37 are engageable with an engaging groove (not shown) formed in a side surface of a boss 52 of a core wire of the steering wheel 51.

Namely, the inner circumferential surface of the inner cylinder 33 of the rotator 31 receives the steering wheel 51. When the boss 52 is inserted from above, the engaging groove and the engaging projections 36 and 37 are put into engagement with each other, and thus the rotator 31 and the steering wheel 51 are made relatively non-rotatable to each other.

In the accommodation space S, a retainer 61 for accommodating the flexible flat cable is rotatably provided. The retainer 61 is formed of a ring-shaped plate, and a plurality of rollers 62 are provided on a top surface thereof. One of the rollers 62 has a different color from that of the other rollers 62 so as to have an external appearance distinguishable from the other rollers 62, and can be seen through a window 32a formed on the top surface of the retainer 61 when the rotator 31 is at the neutral position (see FIG. 2 and FIG. 4).

The provisional fixing mechanism 41 provisionally fixes the rotator 31 at the neutral position on the stator 21. As shown in FIG. 2, the provisional fixing mechanism 41 has the center hole 42 for receiving a steering column (not shown) as a rotation shaft which is rotatable by the steering wheel 51, and is fixed to a bottom part of the rotator 31 so as to be relatively non-rotatable thereto. When the engaging member 44 is moved upward by the urging force of the spring member 43 built in the provisional fixing mechanism 41 in a state of surrounding the center hole 42, the provisional fixing mechanism 41 is engaged with the stator 21 to provide the provisional fixation. When the engaging member 44 is pushed downward against the urging force of the spring member 43, the provisional fixing mechanism 41 releases the stator 21 from the engagement.

This will be described more specifically. As shown in FIG. 3, the provisional fixing mechanism 41 includes a spring bearing 45 hung from, and thus integrally fixed to, the inner cylinder 33 of the rotator 31 so as to be relatively non-rotatable thereto, the spring member 43 having a bottom end held by the spring bearing 45 and formed of a compression spring, and the engaging member 44 which is non-rotatable with respect to the spring bearing 45, is movable upward and downward with respect to the spring bearing 45, and is urged upward by the spring member 43.

A top part of the spring bearing 45 has a double-cylinder structure. On an circumferential surface of the spring bearing 45, a brim part 45a which is contactable with the inner circumferential surface of the fixed-side ring plate 22 of the stator 21 from below is provided. On a top end of an outer cylinder 46 of the double-cylinder structure, a plurality of engaging pieces 46a as fixing unit for fixing the rotator 31 are provided. These engaging pieces 46a are engageable with an engaging claw 33b projecting from the inner circumferential surface of the inner cylinder 33 of the rotator 31.

At positions facing each other while having a center point of the outer cylinder 46 therebetween, cut-away grooves 46b extending in an up-down directions are formed. To the cut-away grooves 46b, the engaging parts 47 formed on an outer circumferential surface of the engaging member 44 are fit so as to be movable upward and downward. The engaging parts 47 are each formed to have a size with which a tip thereof projects outward from the position of the corresponding cut-away groove 46b on the outer circumferential surface.

Figure 5:
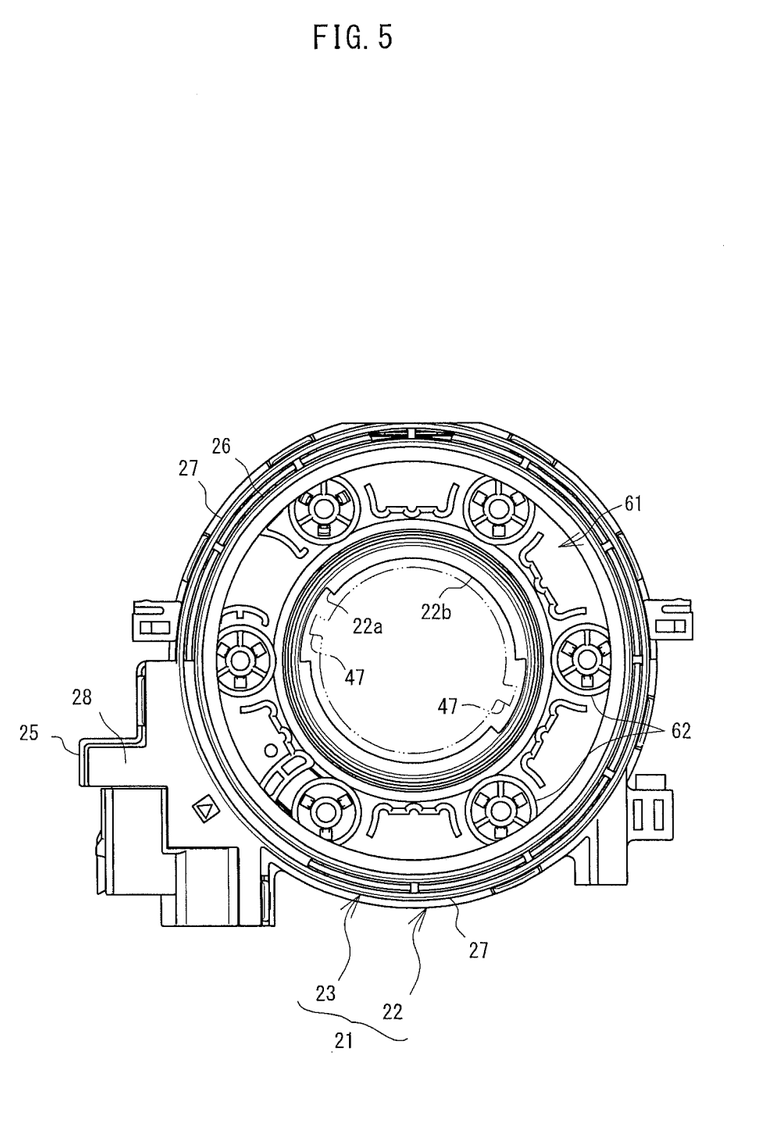
FIG. 5 is a plan view of the rotatable connector device in a state where a rotator is removed.

FIG. 5 is a plan view of the rotatable connector device 11 in a state where the rotator 31 is removed. As shown in FIG. 5, the engageable parts 22a engageable with the engaging parts 47 are each formed by cutting away a part of a ring-shaped projection 22b. The ring-shaped projection 22b is formed to project from an inner circumferential surface of a circular hole at a center of the fixed-side ring plate 22 of the stator 21 toward the center of the fixed-side ring plate 22. As shown in FIG. 1, the projection 22b is formed to have a height with which the projection 22b interferes with the engaging parts 47 when the engaging member 44, which is pushed upward by the urging force of the spring member 43, reaches the uppermost position.

The engageable parts 22a, the engaging parts 47, and the cut-away grooves 46b are formed at one neutral position at which the rotator 31 is located at the neutral position when the engaging parts 47 and the engageable parts 22a are engaged with each other, and at the opposite position which is opposite to the one neutral position with respect to the center point of the center hole 42.

As shown in FIG. 1 and FIG. 3, an inner cylinder 48 of the double-cylinder structure of the spring member 45 is formed to have a smaller height than that of the outer cylinder 46. A bottom end of an inner circumference of the inner cylinder 48 is formed to be a tapered face 48a having a diameter which increases toward the lowermost end thereof in order to allow the rotatable connector device 11 to be attached to a combination switch easily. The spring member 43 is held outside the inner cylinder 48.

On a bottom surface of the spring bearing 45, a helm sensor engaging part 45b engageable with a helm sensor (not shown) is formed. Owing to this, when the spring bearing 45 is rotated together with the rotator 31, the rotation of the rotator 31 is input to the helm sensor.

The engaging member 44 is a generally ring-shaped plate, and has the engaging parts 47 hung therefrom at two positions on the outer circumferential surface thereof which face each other. In the vicinity of the spring contact face 44a which is contactable with the top end of the spring member 43, the regulation unit 49 for regulating the position of the top end of the spring member 43 is provided.

Namely, as the regulation unit 49, a fitting groove 49a for allowing the top end of the spring member 43 to fit thereto and a cylindrical part 49b located inner to the spring member 43 are provided.

The cylindrical part 49b is formed at a position outer to the inner cylinder 48 of the spring bearing 45. In other words, as shown in FIG. 1, inner diameter d1 of the cylindrical part 49a is larger than inner diameter d2 of the center hole 42 provided at the center of the spring bearing 45.

The length and the like of the cylindrical part 49b are set in accordance with conditions such as the length and the position in an inner-outer direction of the inner cylinder 48 of the spring bearing 45, the moving distance of the cylindrical part 49a and the like, so that foreign objects is suppressed from entering the inside of the provisional fixing mechanism 41.

During the assembly of the rotatable connector device 11 having such a structure for accommodating the flexible flat cable, neutral position alignment is performed to locate the rotator 31 at the neutral poison with respect to the stator 21.

The engaging parts 47 of the engaging member 44 integral with the rotator 31 and the engageable parts 22a of the stator 21 are formed at one neutral position and at the opposite position opposite to the one neutral position. Therefore, the rotator 31 and the stator 21 are not fit to with each other at any other positions than these two positions when being in a provisional fixed state. Namely, even when the engaging member 44 is moved upward by the urging force of the spring member 43, the position, in a rotation direction of the rotator 31 with respect to the stator 21, at which the engaging parts 47 and the engageable parts 22a are engageable with each other is limited to two positions including an appropriate position at which the rotator 31 is located at the neutral position with respect to the stator 21. Therefore, whether the position of the rotator 31 is appropriate or not can be visually checked through the window 32a. Thus, the work of neutral position alignment is easy.

Figure 6:
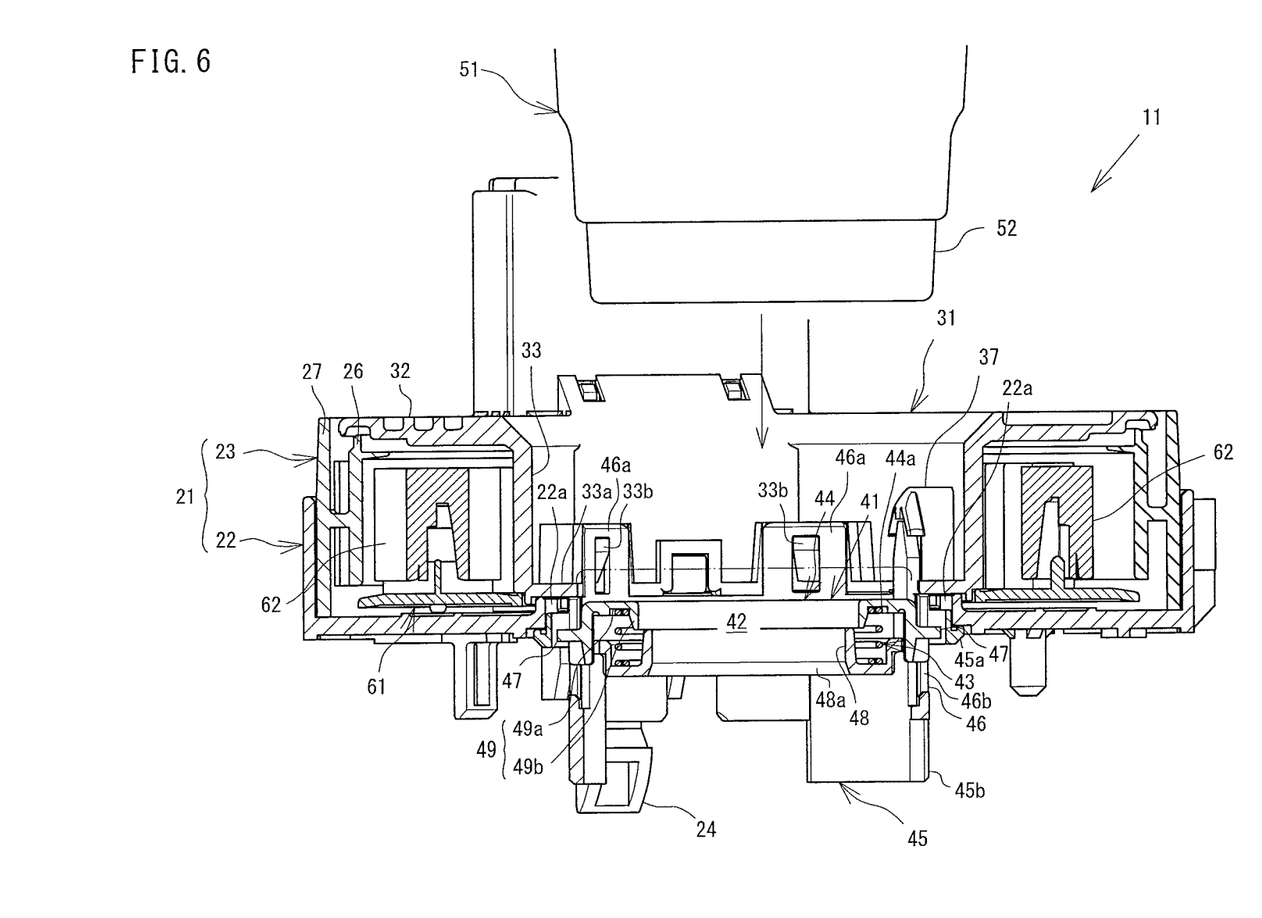
FIG. 6 is a longitudinal cross-sectional view showing a state where the rotator is released from a provisional fixed state.

After the rotatable connector device 11 in which the rotator 21 is provisionally fixed at the neutral position is outserted over the steering column and fixed to the combination switch, the steering wheel 51 in a neutral posture is attached to the rotator 31 as shown in FIG. 6. In this state, the boss 52 of the steering wheel 51 pushes down the engaging member 44 of the provisional fixing mechanism 41 against the urging force of the spring member 43. As a result, the engaging parts 47 are disengaged from the engageable parts 22a, and thus are released from the provisional fixed state. When this occurs, the steering wheel 51 is made rotatable uniformly leftward and rightward.

The engaging parts 47 and the engageable parts 22a are formed at the one neutral position and the opposite position.

Therefore, as compared with the case where one set of the engaging part 47 and the engageable part 22a is provided, the engaging member 44 is moved upward and downward while receiving the urging force of the spring member 43 in a good balance. In addition, the position of the top end of the spring member 43 is regulated by the fitting groove 49a and the cylindrical part 49b provided in the engaging member 44.

Therefore, when the steering wheel 51 is attached to compress and deform the spring member 43, the spring member 43 and the engaging member 44 are suppressed from being inclined. Thus, while the engaging member 44 is moved downward, the center position of the movement is not shifted. The spring contact face 44a of the engaging member 44 is urged uniformly with a good balance, and thus the steering wheel 51 can be appropriately attached easily. This effect is also provided when the spring member 43 is extended to move the engaging member 44 upward. Therefore, when replacing the steering wheel 51, the steering wheel 51 can be appropriately detached easily.

The effect that the center position of the movement is not shifted is provided with more certainty by the regulation unit 49 including the fitting groove 49a and the cylindrical part 49b.

The cylindrical part 49b included in the regulation unit 49 can reduce the gap between the spring contact face 44a of the engaging member 44 and the inner cylinder 48 of the spring bearing 45. Therefore, foreign objects such as sand, dust or the like can be suppressed from entering the accommodation space S through the gap. As a result, generation of strange sound can be suppressed while the steering wheel is rotated.

In addition, inner diameter dl of the cylindrical part 49b of the engaging member 44 is larger than inner diameter d2 of the spring bearing 45. Therefore, even if the rotation connector device 11 is inadvertently inclined when being fixed to the combination switch, the steering column does not contact and abrade the engaging member 44. For this reason, the possibility that the engaging member 44 is disengaged to release the rotator 31 from the provisional fixed state or the engaging member 44 is broken can be reduced.

The fixed body according to the present invention corresponds to the combination switch in the embodiment;

the fixed-side member corresponds to the stator 21;

the rotatable operation tool corresponds to the steering wheel 51;

the rotatable-side member corresponds to the rotator 31; and the rotation shaft corresponds to the steering column.

However, the present invention is not limited to the above-described embodiment and can be implemented in any other embodiment.

For example, the engaging parts 47 and the engageable parts 22a may be formed at four or more even number of positions including the above-described two positions. In this case, it is appropriate that the positions are not too many in order to provide the effect of allowing the rotatable operation tool to be appropriately attached easily. For example, it is preferable that the engaging parts 47 and the engageable parts 22a are formed at about six positions at the maximum.

For example, the engaging parts 47 and the engageable parts 22a may be different in size or shape in order to be engaged with each other only in a state where the rotator 31 is located at the neutral position with respect to the stator 21. In this case, the means for indicating the neutral position can be omitted.

In addition, the regulation unit 49 may be formed of only either the fitting groove 49*a* or the cylindrical part 49*b*.

REFERENCE SIGNS LIST

11 . . . Rotatable connector device
21 . . . Stator
22*a* . . . Engageable part
31 . . . Rotator
41 . . . Provisional fixing mechanism
42 . . . Center hole
43 . . . Spring member
44 . . . Engaging member
44*a* . . . Spring contact face
45 . . . Spring bearing
47 . . . Engaging part
49 . . . Regulation means
49*a* . . . Fitting groove
49*b* . . . Cylindrical part
51 . . . Steering wheel

The invention claimed is:

1. A rotatable connector device, comprising:
a fixed-side member fixed to a fixed body;
a rotatable-side member which is attached to the fixed-side member so as to be rotatable with respect to the fixed-side member both leftward and rightward and is rotatable along with a rotation of a rotatable operation tool fit to a fitting hole at a center of the rotatable-side member; and
a provisional fixing mechanism for provisionally fixing the rotatable-side member at a neutral position on the fixed-side member;
wherein:
the provisional fixing mechanism has a center hole for receiving a rotation shaft rotatable by the rotatable operation tool and is fixed to a bottom part of the rotatable-side member so as to be non-rotatable with respect to the rotatable-side member, and puts engaging parts, of an engaging member moved upward by an urging force of a spring member built in the provisional fixing mechanism in a state of surrounding the center hole, into engagement with engageable parts of the fixed-side member to provide provisional fixation;
the engaging parts and the engageable parts are located at one neutral position at which the rotatable-side member is at the neutral position when the engaging parts and the engageable parts are engaged with each other, and at an opposite position opposite to the one neutral position with respect to a center point of the center hole; in the vicinity of a spring contact face of the engaging member that is contactable with a top end of the spring member, a regulation unit for regulating the position of the top end of the spring member is provided;
the regulation unit is a fitting groove that is formed along an outer circumference of the center hole; and
a top end of the spring member is fit into the fitting groove.

2. The rotatable connector device according to claim 1, wherein the regulation unit is a cylindrical part located inner to the spring member.

3. The rotatable connector device according to claim 2, wherein an inner diameter of the cylindrical part is set to be larger than an inner diameter of the center hole formed at a center of a spring bearing for receiving the spring member.

4. The rotatable connector device according to claim 1, wherein the engaging parts and the engageable parts are engaged with each other only in a state where the rotatable-side member is located at the neutral position with respect to the fixed-side member.

5. The rotatable connector device according to claim 1, wherein the engaging member, which is ring-shaped, comprises the fitting groove having a ring shape.

6. The rotatable connector device according to claim 2, wherein the engaging member, which is ring-shaped, comprises the fitting groove having a ring shape.

7. The rotatable connector device according to claim 3, wherein the engaging member, which is ring-shaped, comprises the fitting groove having a ring shape.

8. The rotatable connector device according to claim 4, wherein the engaging member, which is ring-shaped, comprises the fitting groove having a ring shape.

* * * * *